UNITED STATES PATENT OFFICE.

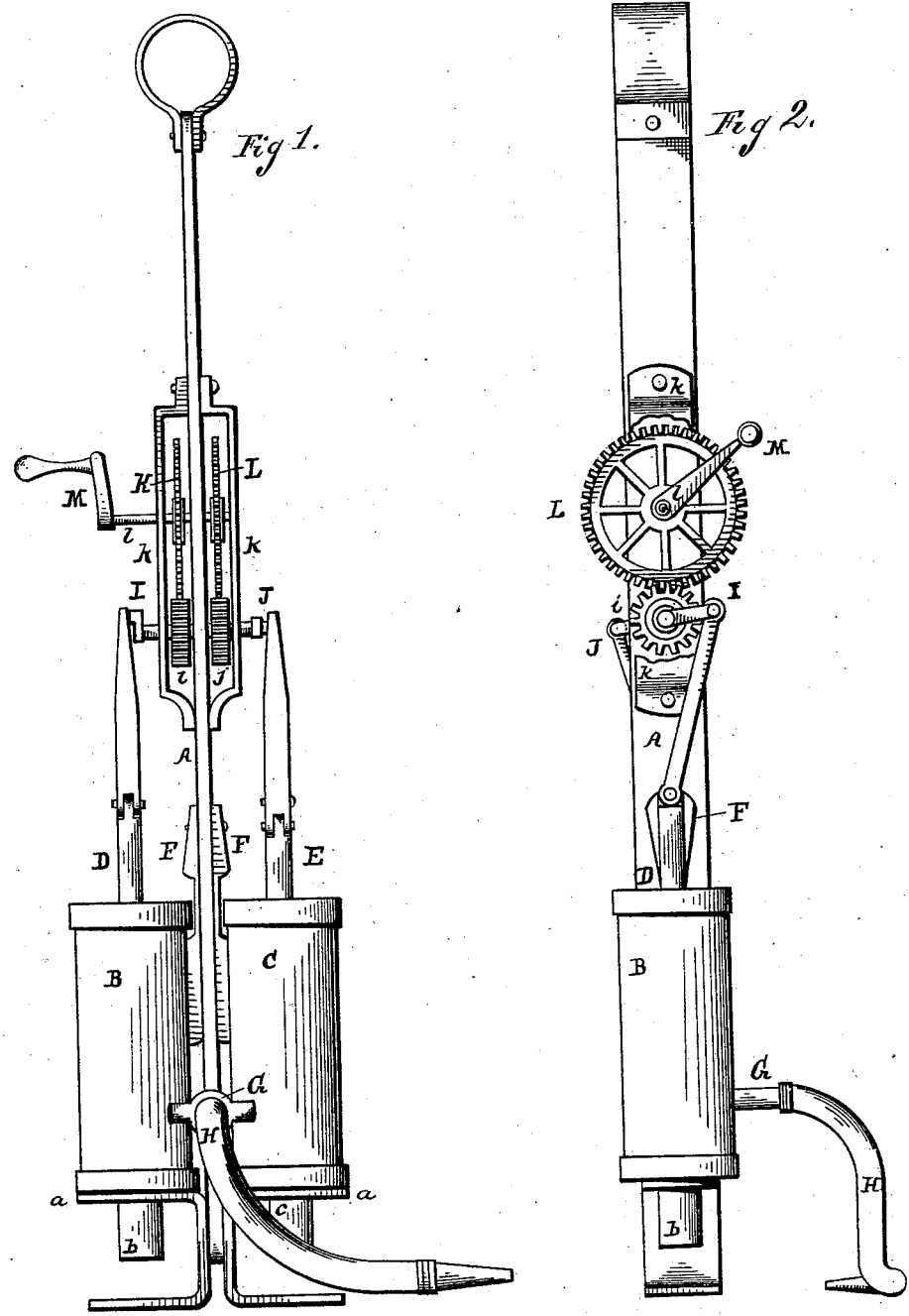

CHRISTOPHER F. CONRAD, OF ADRIAN, MICHIGAN.

PUMP FOR FIRE-EXTINGUISHERS, &c.

SPECIFICATION forming part of Letters Patent No. 293,952, dated February 19, 1884.

Application filed September 10, 1883. (No model.)

*To all whom it may concern:*

Be it known that I, CHRISTOPHER F. CONRAD, of Adrian, county of Lenawee, State of Michigan, have invented a new and useful Improvement in Pumps for Fire-Extinguishers, &c.; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claim.

In the drawings, Figure 1 is a front elevation of a device embodying my invention. Fig. 2 is a side elevation.

The object of my invention is to provide a fire-extinguisher, the device also being adapted as a lawn-sprinkler, and for similar purposes where a pump may be employed.

As illustrated in the drawings, A represents a handle or frame.

B and C represent pump-cylinders, the base of the cylinders provided with suitable inlet-orifices, $b$ and $c$, projecting through suitable arms, $a$, upon the handle or frame, and adapted for connection with the hose-pipe or other mechanism to communicate with the water.

D and E represent the pump piston-rods, provided with any suitable pump mechanism within the pump-cylinder. Said cylinder may be connected to the handle or frame A in any proper manner—as, for instance, by arms F.

G represents the outflow-pipe of the pump-cylinders, said pipe communicating with each of the cylinders, and preferably united, so as to connect with a single hose, H.

I and J represent crank-shafts connected with the piston-rods, said shafts provided with pinions $i$ and $j$.

K and L represent driving cog-wheels adapted to mesh with said pinions, said cog-wheels and pinions preferably having their bearings in a suitable frame or housing, $k$, secured upon the handle or frame A.

M is a crank secured upon the shaft $l$ of the driving cog-wheels, by means of which they are driven.

The device may be either constructed as a portable or stationary pump. I have illustrated it in the drawings as a portable hand-pump; but I would have it expressly understood that I contemplate its use also in any manner for which its construction and operation is adapted. It may be built either on a small or a large scale, as may be desired.

The handle or frame A may be constructed in any desired form, the form shown in the drawings being a convenient construction for a portable pump; but it may be provided with a more elaborate frame, if desired, as I contemplate the employment of any proper frame in connection with the driving-gear and pumping mechanism here shown.

I am aware that it is not broadly new to connect the piston-rods of a double-acting pump with a crank-shaft operated through the medium of gearing and a hand-crank. Such, therefore, I do not broadly claim; but What I do claim is—

The combination of the two cylinders B C, having the outflow-pipe G, connected with their sides, the frame A, the arms F, connecting the cylinders to the frame, the frame or housing $k$, attached to the said frame, the two crank-shafts I and J, journaled in the frame or housing, and provided, respectively, with the pinions $i$ and $j$, the hand-crank shaft $l$, journaled in the frame or housing and provided with two driving cog-wheels, K L, engaging, respectively, with the pinions, and the piston-rods D and E, connected, respectively, with the crank-shafts, substantially as shown and described.

In testimony whereof I sign this specification in the presence of two witnesses.

CHRISTOPHER F. CONRAD.

Witnesses:
   M. P. LONG,
   CYRUS CRANDALL.